United States Patent
Hu et al.

(10) Patent No.: US 11,391,356 B2
(45) Date of Patent: Jul. 19, 2022

(54) HYBRID GEAR CONSTRUCTION

(71) Applicant: Sikorsky Aircraft Corporation, Stratford, CT (US)

(72) Inventors: Wei Hu, Milford, CT (US); Shane Lewis, Honey Brook, PA (US); Bruce D. Hansen, Shelton, CT (US); Bryan Kenneth Baskin, Arlington, TX (US)

(73) Assignee: Sikorsky Aircraft Corporation, Stratford, CT (US)

( * ) Notice: Subject to any disclaimer, the term of this patent is extended or adjusted under 35 U.S.C. 154(b) by 196 days.

(21) Appl. No.: 16/514,213

(22) Filed: Jul. 17, 2019

(65) Prior Publication Data
US 2020/0025279 A1 Jan. 23, 2020

Related U.S. Application Data

(60) Provisional application No. 62/699,979, filed on Jul. 18, 2018.

(51) Int. Cl.
*F16H 55/17* (2006.01)
*F16H 55/06* (2006.01)
*F16H 55/14* (2006.01)
*B64D 35/00* (2006.01)

(52) U.S. Cl.
CPC .......... *F16H 55/14* (2013.01); *B64D 35/00* (2013.01); *F16H 55/06* (2013.01); *F16H 55/17* (2013.01)

(58) Field of Classification Search
CPC .......... F16H 55/17; F16H 55/06; F16H 55/12; F16H 2035/003; F16H 49/001; Y10T 74/19884; Y10T 74/19888; Y10T 74/19967
See application file for complete search history.

(56) References Cited

U.S. PATENT DOCUMENTS

| | | | | |
|---|---|---|---|---|
| 4,969,376 | A * | 11/1990 | Fickelscher | F16H 49/001 475/180 |
| 7,814,809 | B2 * | 10/2010 | Shinohara | F16H 55/06 74/443 |
| 7,861,411 | B2 | 1/2011 | Lunin | |
| 8,042,423 | B2 * | 10/2011 | Bannier | F16H 55/18 74/461 |
| 8,468,904 | B2 * | 6/2013 | Nowicki | F16H 55/16 74/461 |

(Continued)

FOREIGN PATENT DOCUMENTS

DE 10326819 A1 12/2004
DE 102009037624 A1 * 7/2010 ............ G01D 5/04
(Continued)

*Primary Examiner* — Bobby Rushing, Jr.
(74) *Attorney, Agent, or Firm* — Michael Best & Friedrich LLP (57) ABSTRACT

A hybrid gear includes a first portion having a plurality of first engagement features formed from a first material and having a first stiffness and a second portion having a plurality of second engagement features in intermeshing arrangement with the plurality of first engagement features. The plurality of second engagement features is formed from a second material distinct from the first material and having a second stiffness. The first stiffness of the plurality of first engagement features is within 20% of the second stiffness of the plurality of second engagement features.

15 Claims, 5 Drawing Sheets

(56) References Cited

U.S. PATENT DOCUMENTS

| | | | |
|---|---|---|---|
| 9,205,611 B2 | 12/2015 | Oolderink | |
| 9,296,157 B1 | 3/2016 | Handschuh et al. | |
| 9,566,671 B2 * | 2/2017 | Chavdar | B23P 15/14 |
| 2007/0180943 A1 * | 8/2007 | Daout | F16H 55/16 |
| | | | 74/457 |
| 2011/0203397 A1 * | 8/2011 | Bishop | F16H 55/18 |
| | | | 74/437 |
| 2015/0020629 A1 * | 1/2015 | Koszewnik | F16H 55/08 |
| | | | 74/445 |
| 2016/0298750 A1 * | 10/2016 | Schreiber | F16H 49/001 |
| 2016/0363206 A1 | 12/2016 | Modrzejewski et al. | |
| 2017/0056961 A1 * | 3/2017 | Lin | B23K 20/002 |
| 2017/0350473 A1 * | 12/2017 | Bennett | F16H 9/24 |
| 2018/0017150 A1 * | 1/2018 | Leupold | B33Y 10/00 |
| 2018/0073598 A1 * | 3/2018 | Pluta | F01L 1/352 |
| 2018/0142764 A1 * | 5/2018 | Isaka | H02K 7/1166 |

FOREIGN PATENT DOCUMENTS

| | | | | |
|---|---|---|---|---|
| EP | 3208666 A1 * | 8/2017 | | F16H 55/18 |
| GB | 2220595 A * | 1/1990 | | B23K 20/023 |
| TW | 448083 B | 8/2001 | | |
| TW | M512078 U | 11/2015 | | |

\* cited by examiner

HYBRID GEAR CONSTRUCTION

CROSS REFERENCE TO RELATED APPLICATIONS

This application claims the benefit of U.S. Provisional Application Ser. No. 62/699,979 filed Jul. 18, 2018, which is incorporated herein by reference in its entirety.

STATEMENT OF FEDERAL SUPPORT

The invention described herein was made in the performance of work under NASA Contract NNA15AB15B and is subject to the provisions of section 20135 of the National Aeronautics and Space Act (51 U.S.C. § 20135).

BACKGROUND

Embodiments of the present disclosure relate to gears, and more particularly, to a gear design consisting of multiple materials having different stiffnesses.

Gears are used in various industrial and technological applications for power transmission between components. Each gear generally includes an array of gear teeth that mesh with the gear teeth of another gear or toothed component so that the rotation or translation of the first gear can be transmitted to the second.

Gears made from a rigid material, such as metal or metal alloys, are suitable for use in power-transmission systems because they are able to withstand high torque. However, such gears tend to be heavy and may generate noise when they, mesh with other metal gears. In many applications, the weight of gears is not critical. However, in transportation systems including cars, motorcycles, bicycles and especially aircraft, weight is an important consideration. For example, gears used in rotorcraft applications are designed to achieve a minimum weight without sacrificing reliability or longevity.

Hybrid gears are gears constructed from two or more materials. An interface geometry is required to transfer torque between the different materials. However, the difference in stiffness of the two materials may cause unequal deflection at the interface leasing to undesirable contact patterns and pressures.

BRIEF DESCRIPTION

According to an embodiment, a hybrid gear includes a first portion having a plurality of first engagement features formed from a first material and having a first stiffness and a second portion having a plurality of second engagement features in intermeshing arrangement with the plurality of first engagement features. The plurality of second engagement features is formed from a second material distinct from the first material and having a second stiffness. The first stiffness of the plurality of first engagement features is within 20% of the second stiffness of the plurality of second engagement features.

In addition to one or more of the features described above, or as an alternative, in further embodiments the first stiffness is equal to the second stiffness.

In addition to one or more of the features described above, or as an alternative, in further embodiments the first stiffness is greater than second stiffness.

In addition to one or more of the features described above, or as an alternative, in further embodiments first portion includes a hub portion and the second portion includes a web portion.

In addition to one or more of the features described above, or as an alternative, in further embodiments comprising a third portion coupled to second portion, the third portion being formed from a third material having a third stiffness.

In addition to one or more of the features described above, or as an alternative, in further embodiments the third stiffness is greater than the second stiffness.

In addition to one or more of the features described above, or as an alternative, in further embodiments the third stiffness is the same as the first stiffness.

In addition to one or more of the features described above, or as an alternative, in further embodiments the third stiffness is different from both the first stiffness and the second stiffness.

In addition to one or more of the features described above, or as an alternative, in further embodiments the third portion is an outer rim having a plurality of gear teeth, the third portion including a set of the plurality of first engagement features and the second portion including a set of the plurality of second engagement features in intermeshing arrangement with the set of the plurality of first engagement features of the third portion.

In addition to one or more of the features described above, or as an alternative, in further embodiments the first portion of the hybrid gear includes a hub portion and the second portion of the hybrid gear includes an outer rim portion.

In addition to one or more of the features described above, or as an alternative, in further embodiments each of the plurality of first engagement features includes a first tooth and a second tooth separated by a hollowed area.

In addition to one or more of the features described above, or as an alternative, in further embodiments the first tooth and the second tooth are symmetrical.

In addition to one or more of the features described above, or as an alternative, in further embodiments the first tooth has a first bending stiffness and the second tooth has a second bending stiffness, at least one of the first bending stiffness and the second bending stiffness being within 20% of the second stiffness of the plurality of second engagement features.

In addition to one or more of the features described above, or as an alternative, in further embodiments the first bending stiffness is equal to the second bending stiffness.

In addition to one or more of the features described above, or as an alternative, in further embodiments a geometry of the hollowed area is selected to control a bending stiffness of at least one of the first tooth and the second tooth.

According to another embodiment, a method for manufacturing a hybrid gear includes forming a first portion of the hybrid gear having a plurality of first engagement features, the first portion being formed from a first material, forming a second portion of the hybrid gear having a plurality of second engagement features, the second portion being formed from a second material, removing material from the plurality of first engagement features to achieve a desired bending stiffness, the desired bending stiffness of the plurality of first engagement features being within 20% of a bending stiffness of the plurality of second engagement features, and assembling the first portion and the second portion such that the plurality of first engagement features and the plurality of second engagement features are intermeshed.

In addition to one or more of the features described above, or as an alternative, in further embodiments forming a first portion of the hybrid gear and removing material from the plurality of first engagement features occurs simultaneously.

In addition to one or more of the features described above, or as an alternative, in further embodiments comprising optimizing a geometry of the material being removed from the plurality of first engagement features to achieve the desired bending stiffness.

In addition to one or more of the features described above, or as an alternative, in further embodiments removing material from the plurality of first engagement features forms a first tooth and a second tooth, separate from the first tooth, at each of the plurality of first engagement features.

In addition to one or more of the features described above, or as an alternative, in further embodiments at least one of the first tooth and the second tooth has the desired bending stiffness.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
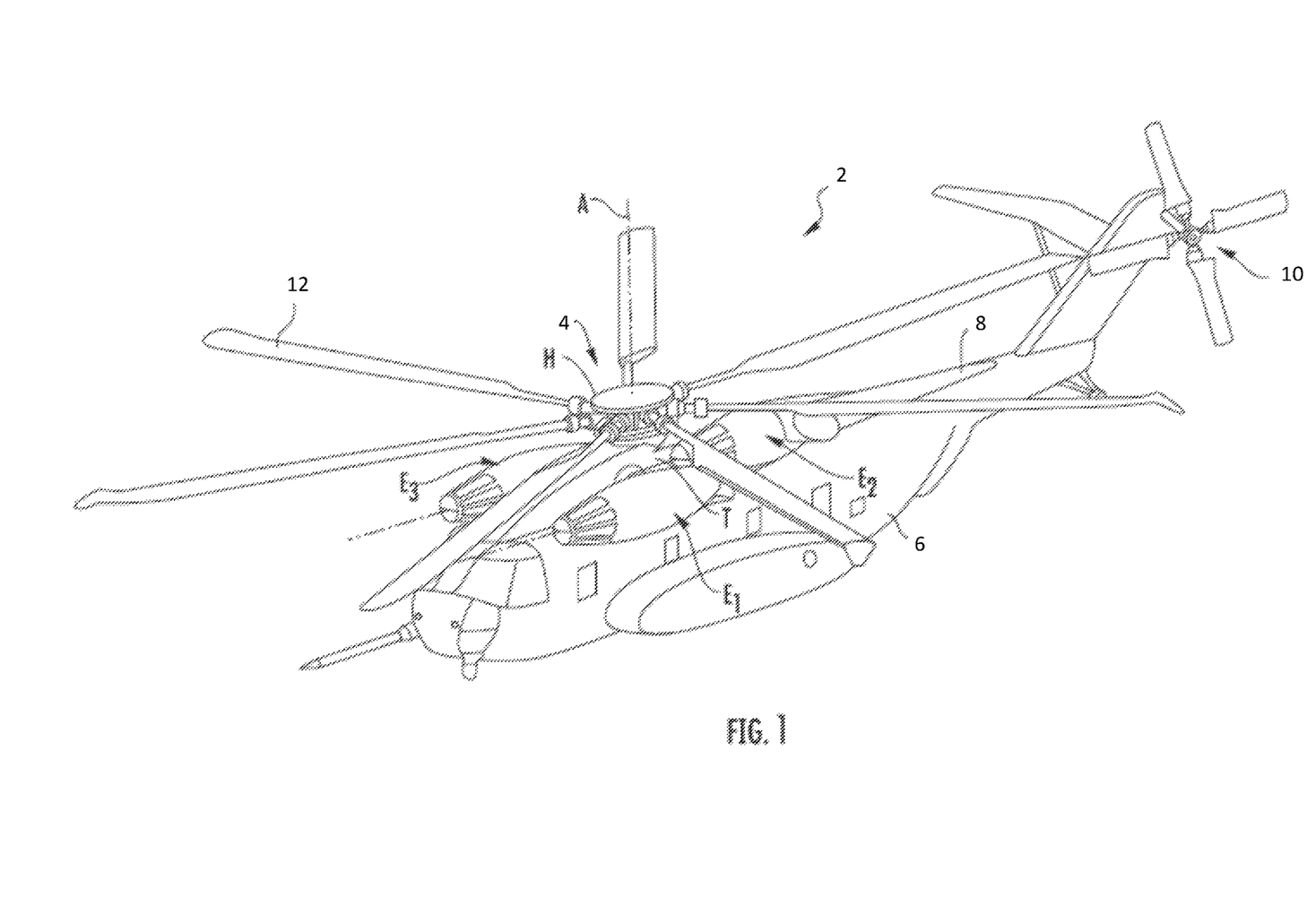
FIG. 1 is a perspective view of an example of an aircraft.

FIG. 1 schematically illustrates a rotary wing aircraft 2 having a main rotor assembly 4. The aircraft 2 includes an airframe 6 having an extended tail 8 which mounts a tail rotor system 10, such as an anti-torque system, a translational thrust system, a pusher propeller, a rotor propulsion system, and the like. The main rotor assembly 4 includes a plurality of rotor blade assemblies 12 mounted to a rotor hub H. The main rotor assembly 4 is driven about an axis of rotation A through a main gearbox of a transmission, indicated at T, by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the disclosure.

Figure 2:
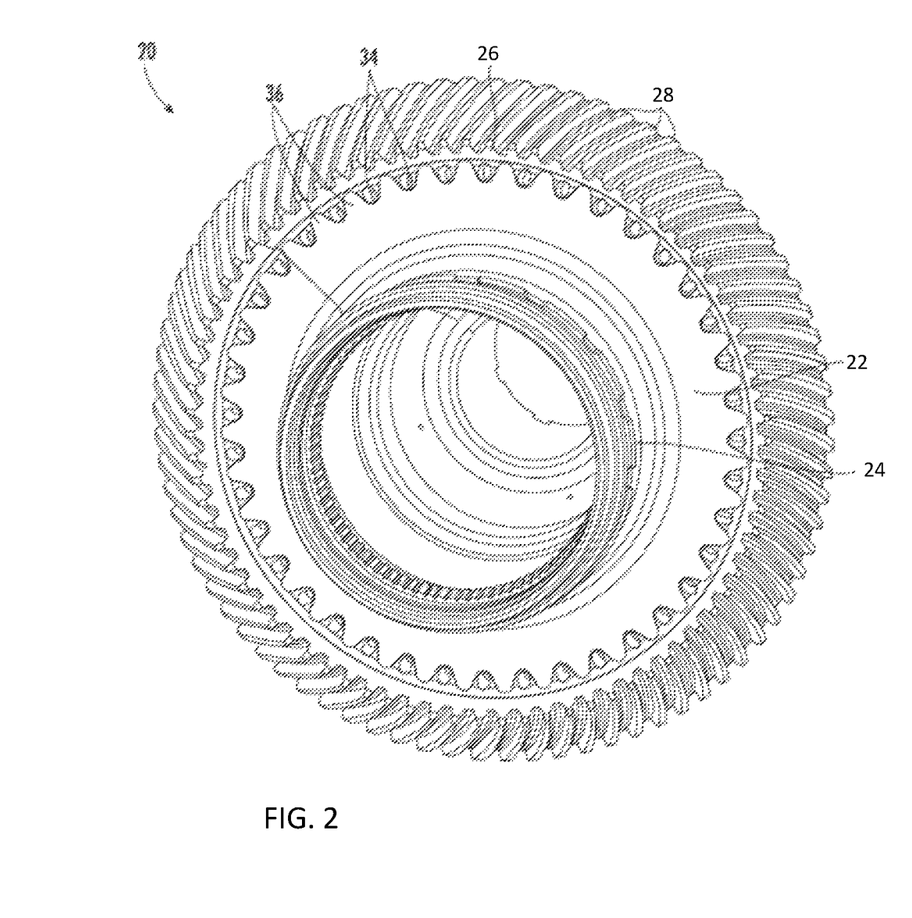
FIG. 2 is perspective view of an example of a hybrid gear according to an embodiment.

Referring now to FIG. 2, an example of a hybrid gear 20 having a two part construction is illustrated. The hybrid gear disclosed herein is suitable for use in a component of the aircraft 2, such as the main gearbox of an aircraft transmission or another system of an aircraft for example. The hybrid gear 20 includes a first portion 22, such a hub portion having a hole 24 formed there through for receiving a shaft (not shown). The gear 20 additionally includes a second portion 26 coupled to the portion 22. In an embodiment, the second portion 26 includes an outer rim portion having a plurality of gear teeth 28 projecting outwardly therefrom. The gear teeth 28 are configured to engage and transfer motion to another component (not shown), such as an adjacent gear within a gear train for example. In the embodiment illustrated in FIG. 2, the hub portion 22 is directly connected to the second, outer rim portion 26.

Figure 3:
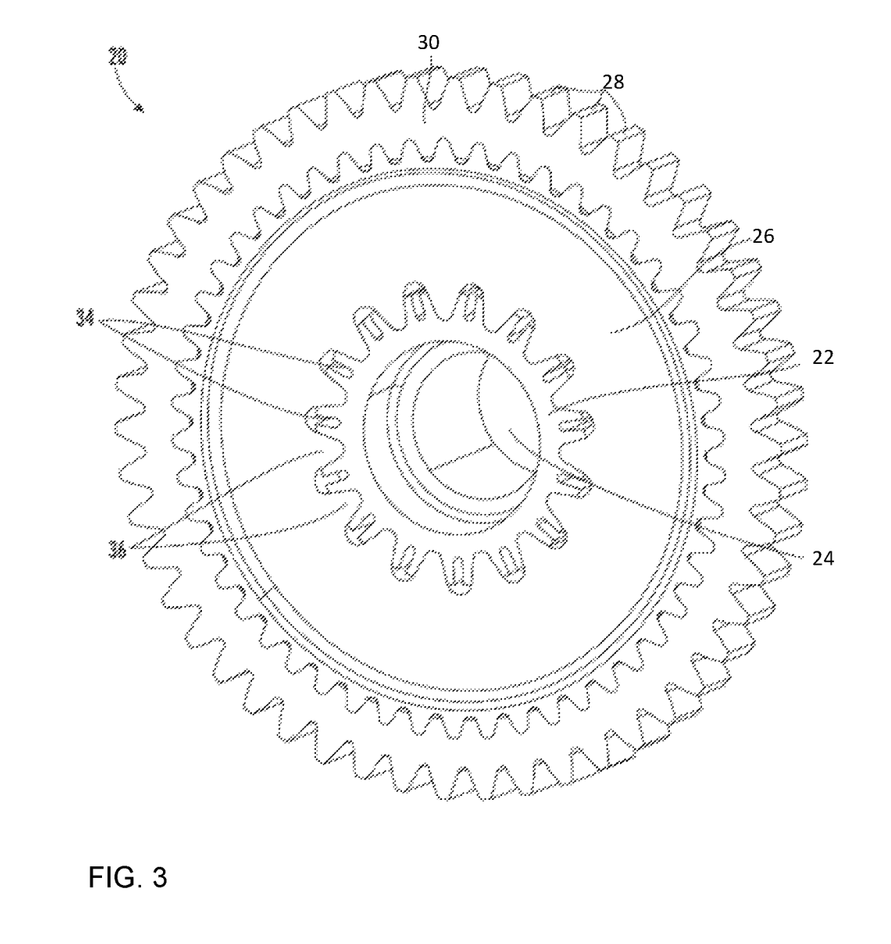
FIG. 3 is perspective view of another example of a hybrid gear according to an embodiment.

With reference now to FIG. 3, an example of a hybrid gear 20 having a three part construction is shown, including a first portion 22, a second portion 26, and a third portion 30. As previously described, the first portion 22 may include the hub portion. However, in embodiments including three or more portions, one or more additional portions may be disposed between the hub portion and the outer rim portion. Accordingly, in the embodiment illustrated in FIG. 3, the second portion 26 of the hybrid gear 20 includes a web portion and the third portion 30 of the gear 20 includes the outer rim portion having a plurality of gear teeth 28, as previously described. The gears 20 having a two part and three part construction illustrated and described herein are intended as an example only and it should be understood that a gear 20 having any number of portions is within the scope of the disclosure. Further, although the gear teeth 28 at the exterior surface of the gear 20 are illustrated having a helical configuration or a straight configuration, the gear teeth 28 may have any suitable configuration.

Adjacent portions of the hybrid gear 20 are formed from different materials. With reference to FIG. 2, the hub portion 22 of the gear 20 is formed from a first material having a first stiffness and the adjacent outer rim portion 26 of the gear 20 is formed from a second material having a second stiffness other than the first stiffness. In the embodiment of FIG. 3, the hub portion 22 and the outer rim portion 30 may be formed from a first material and the intermediate web portion 26 may be formed from a second material. Alternatively, the outer rim portion 30 may be formed from a third material, distinct from the first material and the second material, and having a third stiffness other than first and/or second stiffnesses.

The portions of the gear 20 including a plurality of gear teeth 28 configured to engage and drive movement of a separate component or gear, such as the outermost portion of the gear 20, i.e. the rim portion, and in some embodiments the hub portion 22 for example, are typically formed from a metal or metal alloy having a stiffness sufficient to withstand the high loads applied thereto. The portions of the gear 20 located in direct contact with such portions, such as the web portion 26 and in some embodiments the hub portion 22 for example, are formed from a material having a reduced weight and stiffness compared to the other portions of the gear 20. The reduced weight material may be any suitable material, including but not limited to a composite and a metal or metal alloy for example.

Figure 4:
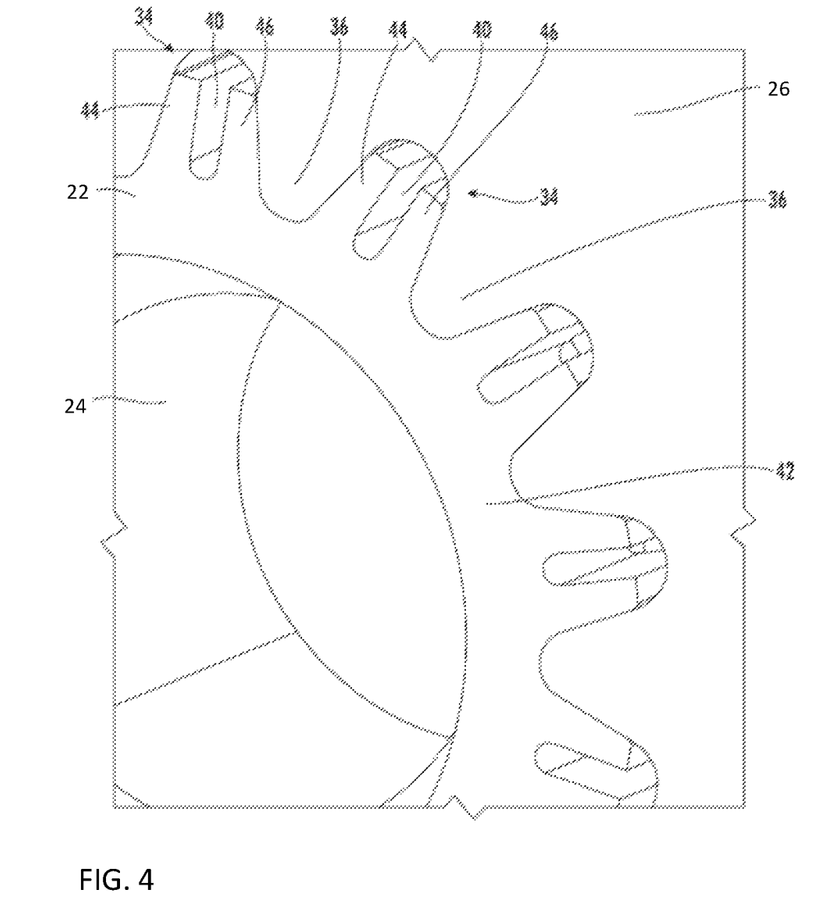
FIG. 4 is a detailed perspective view of an interface of the hybrid gear of FIG. 3 according to an embodiment.
Figure 5:
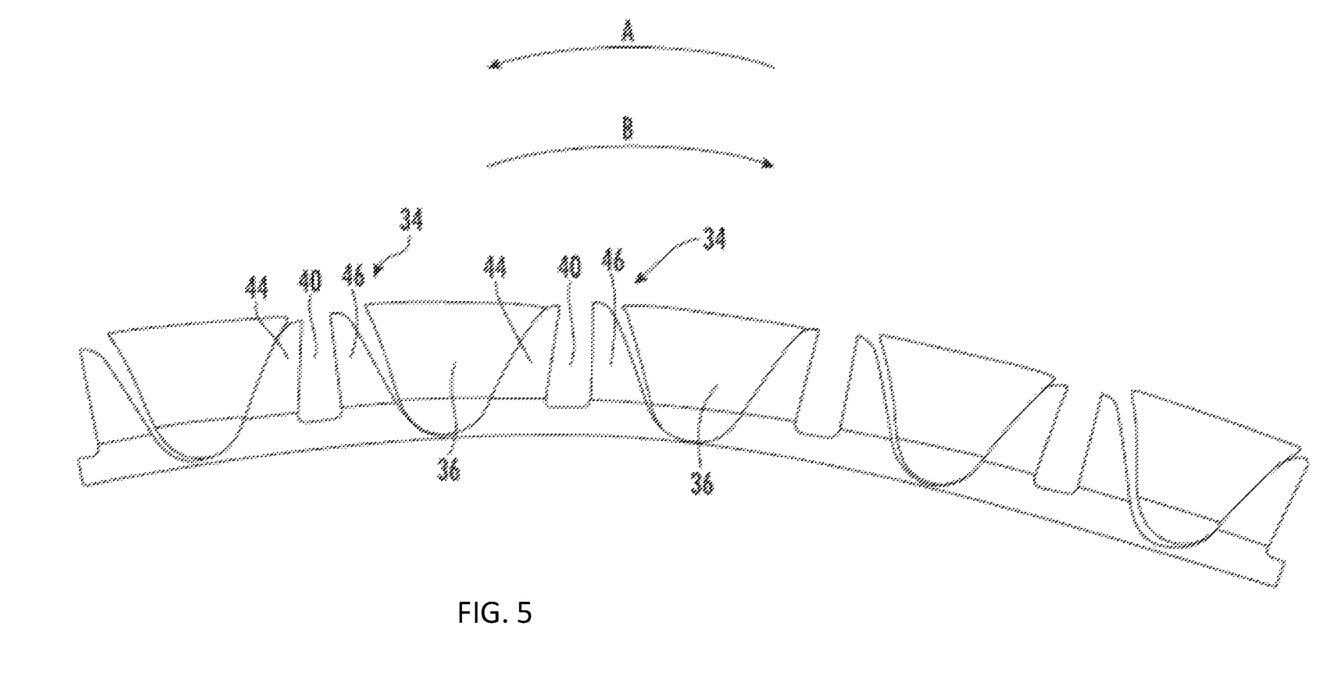
FIG. 5 is an end view of an interface of a hybrid gear during rotation of the hybrid gear in a first direction according to an embodiment.

With reference to FIGS. 4-5, the interface between the hub portion 22 and adjacent second web portion 26 of the gear 20 of FIG. 3 is shown in more detail. It should be understood that the interface illustrated and described herein is representative of any interface between adjacent portions of the gear 20 formed from different materials having different material stiffnesses, including the interface between the first hub portion 22 and second outer rim portion 26 shown in FIG. 2. As shown, the hub portion 22 of the gear 20 includes a plurality of first teeth or engagement features 34 projecting from the first hub portion 22 towards the second web portion 26. The web portion 26 similarly includes a plurality of second engagement features 36 projecting from the second web portion 26 toward the hub portion 22. The first and second engagement features 34, 36 are generally complementary to one another and are disposed in intermeshing engagement to transfer torque between the first hub portion 22 and the second web portion 26. The gear 20 of FIG. 3, may include similar first and second engagement features at the interface between the second web portion 26 and the third outer rim portion 30. While shown but not labeled in FIG. 3 for purposes of simplicity, it is understood that features 34, 36 may also be formed between the second web portion 26 and third rim portion 30 of FIG. 3. Accordingly in embodiments where the gear 20 has two or more coupled portions, the first and second engagement features 34, 36 may be disposed at the interface between any two adjacent portions.

The engagement features 34, 36 typically have the same stiffness as the corresponding component of the interface, i.e. the first hub portion 22 for feature 34, the second web portion 26 for feature 36 for the embodiment in FIG. 3, and the first hub portion 22 for feature 34 and the second outer rim portion for feature 36 with respect to the embodiment in FIG. 2. As a result, the difference in the stiffness of the material of the hub portion 22 and the material of the adjacent web portion 22 may cause an unequal deflection of the engagement features 34, 36 at the interface. Accordingly, a geometric stiffness of the engagement features of the portion having the greater material stiffness may be controlled to overcome the difference in material stiffness at the interface. More specifically, the geometric stiffness may be modified to reduce the difference in the bending stiffness of the engagement features 34, 36. In some embodiments, the geometric stiffness may be modified to create an equivalent bending stiffness between the first and second engagement features 34, 36 at the interface. This modification of the geometric stiffness may be particularly useful in applications where the ratio of the Young's Modulus of the first material to the Young's Modulus of the second material is greater than one, and in some embodiments two or greater.

Because the first hub portion 22 has a greater stiffness than the second web portion 26, in an embodiment, the geometric stiffness of the plurality of first engagement features 34 is controlled by removing material from the plurality of first engagement members 34. As best shown in FIG. 4, a hollowed area 40, such as a slot or channel for example, is formed in each first engagement member 34. The hollowed area 40 may be formed simultaneously with the first engagement feature 34, or alternatively, may be formed after the first engagement feature 34 is formed, such as via a machining operation for example. The hollowed area 40 may extend from a first end face 42 of the gear 20 to a second opposite end face (not shown) of the gear 20. As a result, the hollowed area 40 defines a first tooth 44 and a second tooth 46, separate from the first tooth 44, at each first engagement feature 34. The hollowed area 40 is illustrated as being formed at a center of each first engagement feature 34 such that the first tooth 44 and the second tooth 46 are symmetrical. In other embodiments, however, the hollowed area 40 may be arranged at another position about the first engagement feature 34 such that the first tooth 44 and the second tooth 46 are not substantially equal in size and/or shape.

The bending stiffness of the first tooth 44 and the second tooth 46 of a first engagement feature 34 is reduced compared to a first engagement feature 34 that does not include the hollowed area 40. Accordingly, one or more parameters of the hollowed area 40, such as the depth, width, and radii for example, may be adjusted to achieve a desired geometric stiffness, and therefore bending stiffness, of the first and second teeth 44, 46. It should be understood that the hollowed area 40 may have a different geometry than that shown in the illustrated, non-limiting embodiments. In an embodiment, the bending stiffness of one or both of the first and second tooth 44, 46, is less than the bending stiffness of the material of the first hub portion 22, and may be compatible with the bending stiffness of the material of the second web portion 26. In an embodiment, the term "compatible" as used herein suggests that the bending stiffness of the first and second tooth 44, 46 is within 20%, within 10%, within 5%, and in some instances equal to the bending stiffness of the material of the web portion 30.

With specific reference to FIG. 5, if a rotational force is applied to the hub portion 26 in a first direction, indicated by arrow A, the torque transferred between the first hub portion 22 and the second web portion 26 is applied only to the first tooth 44 of each first engagement feature 34. The second tooth 46 of each first engagement feature 34 is not loaded during rotation in the first direction, as shown in the FIG. In response to the load being applied thereto, the first teeth 44 are able to bend or deflect toward the hollowed area 40. Similarly, if a rotational force is applied to the first hub portion 22 in a second, opposite direction, indicated by arrow B, the torque transferred between the hub portion 22 and the web portion 26 is applied only to the second tooth 46 of each first engagement feature 34. The first teeth 44 are not loaded during rotation in the second direction. The second teeth 46 are therefore able to bend or deflect toward the hollowed area 40 in response to the load applied thereto. The bending stiffness of the first tooth 44 and the second tooth 46 should be controlled such that during rotation in either the first direction or the second direction, respectively, no contact occurs between the teeth 44, 46 as a result of the deflection.

Inclusion of the hollowed areas 40 in the engagement features 34 of the portion formed from a stiffer material reduces the contact pressures at the interface between the two portions of a hybrid gear 20. As a result, the overall weight of the gear 20 may be reduced via a hybrid construction while controlling the contact and therefore torque transfer through the various portions of the gear 20.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid gear comprising:
    a first portion having a plurality of first engagement features arranged about an outer circumference of the first portion, the first portion being formed from a first material having a first stiffness and the plurality of first engagement features having a bending stiffness, wherein the first stiffness is greater than the bending stiffness; and
    a second portion of the hybrid gear connected to the first portion and coaxial and rotatable therewith, the second portion including a plurality of second engagement features in intermeshing arrangement with the plurality of first engagement features such that deflection is allowed between the intermeshed first and second engagement features during rotation of the hybrid gear, the second portion being formed from a second material distinct from the first material and having a second stiffness less than the first stiffness; and
    an outer rim portion having a plurality of gear teeth for engaging another gear, the first and second portions being disposed within the outer rim portion;
    wherein the bending stiffness of the plurality of first engagement features is within 20% of the second stiffness of the second portion.

2. The hybrid gear of claim 1, wherein the bending stiffness is equal to the second stiffness.

3. The hybrid gear of claim 1, wherein the bending stiffness is greater than second stiffness.

4. The hybrid gear of claim 1, wherein the first portion includes a hub portion and the second portion includes a web portion.

5. The hybrid gear of claim 4, further comprising a third portion coupled to the second portion and coaxial and rotatable therewith, the third portion being formed from a third material having a third stiffness.

6. The hybrid gear of claim 5, wherein the third stiffness is greater than the second stiffness.

7. The hybrid gear of claim 5, wherein the third stiffness is the same as the first stiffness.

8. The hybrid gear of claim 5, wherein the third stiffness is different from both the first stiffness and the second stiffness.

9. The hybrid gear of claim 5, wherein the third portion defines the outer rim portion and the plurality of gear teeth, the third portion including a plurality of engagement features, and wherein the second portion includes another plurality of engagement features arranged about a circumference of the second portion and in intermeshing arrangement with the plurality of engagement features of the third portion.

10. The hybrid gear of claim 1, wherein the first portion of the hybrid gear includes a hub portion and the second portion of the hybrid gear includes an outer rim portion.

11. The hybrid gear of claim 1, wherein each of the plurality of first engagement features includes a first tooth and a second tooth separated by a hollowed area.

12. The hybrid gear of claim 11, wherein the first tooth and the second tooth are symmetrical.

13. The hybrid gear of claim 11, wherein the first tooth has a first bending stiffness and the second tooth has a second bending stiffness, at least one of the first bending stiffness and the second bending stiffness being within 20% of the second stiffness of the plurality of second engagement features.

14. The hybrid gear of claim 13, wherein the first bending stiffness is equal to the second bending stiffness.

15. The hybrid gear of claim 11, wherein a geometry of the hollowed area is selected to control the bending stiffness of each of the plurality of first engagement features.

* * * * *